US005660884A

United States Patent [19]

Crook et al.

[11] Patent Number: 5,660,884

[45] Date of Patent: Aug. 26, 1997

[54] METHOD OF SURFACE PREPARATION OF TITANIUM SUBSTRATES

[75] Inventors: Russell A. Crook, South Ogden; Larry W. Poulter, Ogden, both of Utah

[73] Assignee: Thiokol Corporation, Ogden, Utah

[21] Appl. No.: 550,957

[22] Filed: Oct. 31, 1995

Related U.S. Application Data

[63] Continuation-in-part of Ser. No. 327,305, Oct. 21, 1994, Pat. No. 5,520,768.

[51] Int. Cl.$^{6}$ .......... B05D 3/00

[52] U.S. Cl. .......... 427/327; 134/26; 156/281; 156/319; 428/420

[58] Field of Search .......... 156/319, 281; 427/327; 134/26; 428/420

[56] References Cited

U.S. PATENT DOCUMENTS

| | | | |
|---|---|---|---|
| 3,657,003 | 4/1972 | Kenney | 106/286.1 |
| 3,799,838 | 3/1974 | Shaw et al. | 428/420 |
| 3,956,353 | 5/1976 | Plueddemann | 428/420 |
| 4,362,783 | 12/1982 | Graham | 428/420 |
| 5,108,793 | 4/1992 | van Ooij et al. . | |
| 5,112,418 | 5/1992 | Pike . | |
| 5,200,275 | 4/1993 | van Ooij et al. . | |
| 5,221,371 | 6/1993 | Miller . | |
| 5,238,518 | 8/1993 | Okubi et al. . | |
| 5,326,594 | 7/1994 | Sabata et al. . | |

OTHER PUBLICATIONS

"Good-bye Degreaser; Hello Compliance", Bailey, Jane M., *Industrial Paint & Powder,* Mar. 1995, pp. 22–23.

*Primary Examiner*—John J. Gallagher

*Attorney, Agent, or Firm*—Cushman Darby & Cushman IP Group of Pillsbury Madison & Sutro, LLP; Ronald L. Lyons, Esq.

[57] ABSTRACT

A surface preparation process has been developed for titanium and titanium alloy substrates that greatly improves the resulting bond. The process improves bond strength, fracture toughness, durability and failure mode of adhesive bonds. The process also decreases the sensitivity of titanium substrates to processing variables such as humidity, temperature and hence the processing timelines. The process involves treating a titanium or titanium alloy surface with a soluble silicate solution, such as an alkali metal metasilicate, and subsequently treating the surface with a solution of an organofunctional silane. Employing this two step process, bonding to the titanium substrate is improved.

20 Claims, No Drawings

METHOD OF SURFACE PREPARATION OF TITANIUM SUBSTRATES

RELATED APPLICATION

This invention is a continuation-in-part of U.S. patent application Ser. No. 08/327,305, filed Oct. 21, 1994, titled "Method of Surface Preparation of Aluminum Substrates," now U.S. Pat. No. 5,520,768, which is incorporated herein by reference.

FIELD OF THE INVENTION

The present invention is related to surface cleaning and preparation of titanium or titanium alloy metal substrates in order to improve bond strength, fracture toughness, durability and failure mode of adhesive bonds to those substrates.

BACKGROUND OF INVENTION

In constructing various structures from metals it is important to have the capability of bonding to metal surfaces. This includes bonding metal surfaces to other metal surfaces, as well as bonding non-metal materials to metal surfaces. In many applications it is possible to use simple mechanical bonding mechanisms, such as bolts, screws, or rivets. In other applications, concerns over the added weight of mechanical fasteners make the use of adhesive more viable. Various adhesives are known and commonly used in the art of bonding metals together or bonding non-metal materials to metals. For example, various epoxy-based adhesives are widely used for these applications.

When metals are bonded using an adhesive it is generally important to provide the strongest and most durable bond possible. In the past it was difficult to assure a strong bond when using adhesive. For example, processing conditions during bond fabrication often cause dramatic reductions in bond strength. This is particularly true when bonding to metals such as titanium and titanium alloys. Bonding to titanium materials has presented a special challenge.

Titanium and titanium alloys are considered difficult metals to bond to because of the propensity of titanium surfaces to form a weak hydrated surface layer of titanium oxide. One theory for reduced bond durability of titanium is the reversion of the anatase morphology of $TiO_2$ to the more stable rutile form. Anatase, the preferred oxide formed by many surface preparation processes, can revert to the rutile form on exposure to warm/moist environments. This conversion is accompanied by a decrease in volume which induces stresses at the adhesive/oxide interface, thereby accelerating joint failure. The morphology of the oxide layer is very important for providing a durable high strength bond. The surface morphology and adhesive bond durability are dependent upon the type of surface treatment received prior to bonding.

Conventional surface treatments of titanium include mechanical, chemical and electrochemical processes. Mechanical treatment includes grit blasting and abrasive processes. Chemical treatments include chlorinated solvents, alkaline cleaners, proprietary caustic etches, nitric-hydrofluoric acid etch, phosphate-fluoride conversion, proprietary nitric acid-chromic acid-fluoride etch (Pasa-Jell), alkaline-peroxide etch and activated chemical oxidation. A VAST (Vought Abrasive Surface Treatment) process combines mechanical and chemical processes by using a high pressure slurry of fine alumina abrasive containing fluorosilicic acid followed by a nitric acid post treatment to prepare the surface. Electrochemical processes include chromic acid anodization, chromic acid-fluoride anodization, alkaline-peroxide anodization and cathodic deposition. These processes include the use of environmentally unfriendly, toxic and hazardous chemicals and are being phased out because of environmental legislation and increasing waste disposal costs.

Accordingly, what is needed in the art are effective and efficient methods of surface preparation and treatment of titanium and titanium alloys, in order to provide stable adhesive bonding to the metal substrate. In that regard it would be a significant advancement in the art to provide methods of titanium surface treatment and preparation which were relatively simple, and which used readily available materials. It would be a related advancement in the art to provide such methods which employed materials that did not present a significant environmental hazard.

It would be a further advancement in the art to provide methods of titanium surface treatment and preparation which provided increased bond strength. It would also be an advancement to provide such which resulted in stable bonds which did not significantly degrade over time. It would be another advancement in the art to provide such methods which resulted in bonds which were unlikely to fail.

Such methods are disclosed and claimed herein.

SUMMARY OF THE INVENTION

The present invention relates to methods for treating titanium and titanium alloy substrates to improve bonding to such substrates. The present invention involves a two step surface treatment process. The first step of the process involves treating the metal surface with an alkaline aqueous silicate solution. The silicate solution [$(SiO_3^{=})aq$] is preferably a solution of an alkali metal metasilicate. Metasilicates are desirable because of their buffering capacity. The alkali metal metasilicates may include, for example, sodium, potassium, or lithium metasilicates. Alternatively, the metasilicate may be provided in the form of an amine, or quaternary ammonium metasilicate, or any other solvated form of $(SiO_3^{=})aq$. These materials are well known to those of skill in the art, and many of these materials are commercially available. Detergents, emulsifiers, and other cleaners tailored to specific soils may be added to the metasilicate solution to accomplish simultaneous cleaning and in-situ surface treatment.

The second step in the process involves treatment of the surface with an organofunctional silane coupling agent. Examples of these materials include: gamma-glycidoxypropyltri-methoxysilane, gamma-aminopropyltrimethoxysilane, gamma-methacryloxypropyltrimethoxysilane, N-[2-(vinylbenzylamino) ethyl]-3-aminopropyltrimethoxysilane, phenyltrimethoxysilane, [glyci-doxy(epoxy)] polyfunctional methoxysilane, and similar polyfunctional ethoxy and polyfunctional hydride containing silanes. These and similar silanes are well known to those of skill in the art and many are commercially available. The functionality of the organofunctional silane used is preferably compatible with the adhesive or coating to be applied. (Silane coupling agents form a covalent bond with the titanium oxide sites and the structural adhesive or coating.) This covalent bond and the hydrophobic nature of the silane restrict moisture migration into the bondline and therefore restrict bond degradation with aging. The silane solution may be buffered, as required, for pH control and to accelerate the silane hydrolysis rate. Organic solvents may be substituted for water when using non-water soluble silanes.

(The reactive organofunctional silane solution is preferably substantially free of a cross-linking agent so that the silane solution treatment does not produce a siloxane coating.) It is not intended that the silicate and silane treatment form an impervious, water insoluble metasilicate/siloxane coating on the titanium surface. Although such impervious coatings are obtained by including cross-linking agents in the silane solution according to the disclosure of U.S. Pat. No. 5,326,594 to Sabata et al, such coatings are not necessary to obtain the beneficial results disclosed herein.

A synergistic effect is observed with the aqueous silicates followed by organofunctional silane rinse which produces a process insensitive, robust bond system. The process enhances the bond strength, fracture toughness, failure mode, and durability of the resulting bond. The process is insensitive to process variations including time delays, adhesive staging, relative humidity, processing temperature and solution concentrations. The process may be applied by spray, dip, immersion, brush, or other contact methods. The process is applicable to a wide variety of adhesive types, elastomers, fiber reinforced plastics, paints and coatings. The resulting bond is superior to that formed by conventional surface treatments and is environmentally friendly.

Thus, the present invention provides effective and efficient methods of surface preparation and treatment of titanium in order to provide stable adhesive bonding to titanium substrates. The present invention also provides methods which result in bonds which are unlikely to fail.

DETAILED DESCRIPTION OF THE INVENTION

As discussed above, the preferred embodiments of the present invention consist of treating titanium or other metal surfaces with a (metasilicate solution which cleans and/or modifies the surface of the metal.) This step is followed by applying a reactive organofunctional silane rinse which further modifies the surface in preparation for bonding. Thus, the present invention provides a simple, two-step cleaning and in-situ surface preparation process for titanium, titanium alloy, or other metal surfaces to prepare them for bonding.

The surface is first treated with an aqueous solution of a metasilicate (or alkaline aqueous silicate), formulated in accordance with Table I. The solution preferably includes from about 0.004 molar to about 0.04 molar silicate, and more preferably from about 0.015 molar to 0.035 molar. While this concentration range is presently preferred, in certain instances it may be desirable or possible to add much more silicate to the aqueous solution. Thus, silicate solutions containing 0.1 molar silicate, 1 molar silicate, and up to the limits of solubility may be employed if desired or needed for particular applications. It will be appreciated, however, that the primary objective of this treatment is to provide a very thin silicate layer on the surface. Thus, concentrations above 0.04 molar are generally unnecessary, and may be counterproductive and wasteful in some instances.

(Optional ingredients) in the metasilicate solution may also include various cleaning additives, such as detergents, emulsifiers, and cleaners, tailored to specific soils, to accomplish simultaneous cleaning and in-situ surface treatment. The pH of the solution, with or without the optional ingredients, is generally in the range of from about 11.5 to about 13.5, and preferably in the range from 11.5 to 12.5.

TABLE I

| Cleaner/Treatment Solution* | |
|---|---|
| Ingredient | Preferred Concentration (molar) |
| Soluble Metasilicate | 0.004 to 0.04 |
| Cleaning additives | Optional |
| pH = 11.5 to 13.5 | |

As discussed above, treatment of the metal surface with the silicate solution is followed by a rinse with an organofunctional silane coupling agent. This silane solution is preferably formulated in accordance with Table II. It is presently preferred that the solution contain from about 0.02 molar to about 0.5 molar silane, based on a silane molecule having three reactive functional groups at the metal end and one reactive functional group at the adhesive end of the silane molecule. Again, much higher concentrations of silane in solution may also be used. Solutions having 1 molar silane or an even greater silane concentration fall within the scope of the present invention. However, the general objective of this treatment is to provide a thin layer of silane on the surface. Thus, applying silane solutions having concentrations above 0.5 molar is generally unnecessary and wasteful.

TABLE II

| Reactive Rinse Solution | |
|---|---|
| Ingredient | Preferred Concentration (molar*) |
| Organofunctional silane | 0.02 to 0.5 |
| Acid Buffer | As Required |

*Based on a silane molecule having three reactive functional groups at the metal end and one reactive functional group at the adhesive end.

The functionality of the organofunctional silane may be selected such that it is compatible with the adhesive or coating to be applied. Silanes of the type usable in the present invention include gamma-glycidoxypropyltrimethoxysi-lane, gamma-aminopropyltrimethoxysilane; gamma-methacryloxypropyltrimethoxysilane, N-[2-(vinylbenzylamino)ethyl]-3-amino-propyltrimethoxysilane, phenyltrimethoxysilane, [glycidoxy-(epoxy)] polyfunctional methoxysilane, and similar polyfunctional ethoxy and polyfunctional hydride containing silanes.

It is generally necessary to hydrolyze commercial silane products. Accordingly, an acid or acid buffer, such as a sodium acetate/acetic acid buffer or other similar buffer, may be added to the silane rinse solution as required for pH control and to accelerate the silane hydrolysis reaction rate. The amount and concentration of such buffers or acids is well within the knowledge of those skilled in the art, however, generally a pH in the range from 4 to 7 is acceptable, with a pH about 5 range being presently preferred.

The process of the present invention enhances the bond strength, fracture toughness, failure mode, and durability of the resulting adhesive bond. The resulting bond fracture toughness, bond strength and durability are less sensitive to process variations. Such variations may include time delays or variations, adhesive staging, relative humidity, processing temperature, and solution concentrations. The solutions used in the process may be applied by spray, dip, immersion, brush, or other contact methods.

While the present discussion has focused on bonding to titanium surfaces, the process of the present invention is also applicable to other metals, metal alloys, adhesive types, elastomers, fiber reinforced plastics, paints, and coatings. The resulting bond is superior to that formed by conventional and electrolytic surface treatments and negates the requirement for anodization or other environmentally hazardous surface treatment and modification processes.

EXAMPLES

The following examples are given to illustrate various embodiments which have been made or may be made in accordance with the present invention. These examples are given by way of example only, and it is to be understood that the following examples are not comprehensive or exhaustive of the many types of embodiments of the present invention which can be prepared in accordance with the present invention.

Methodologies

In order to evaluate the metasilicate/silane process, it was necessary to select a discriminating adhesive and a sensitive, interfacial bond strength test method. Dexter Hysol EA946 is a rubbery epoxy adhesive that was selected because the failure mode is typically interfacial. The characteristics of this adhesive makes it very sensitive to changes in surface chemistry.

Fracture toughness was selected as a test method for measuring the interfacial strength of the bond system. This method, described in ASTM D 3433, measures the energy required to propagate a crack in a bondline. It is very sensitive to surface chemistry, morphology and other surface conditions. Tapered double cantilever beams were selected as the bond specimen because fracture toughness in this configuration is independent of crack length, thereby simplifying data reduction. In this instance, the Mode I fracture toughness, $G_{IC}$, is calculated by the following equation:

$$G_{IC}=4mP_c^2/(Ew^2)$$

where:

m=geometry factor ($in^{-1}$)

$P_c$=critical load for crack propagation (1*b*)

E=Adherend modulus (psi)

w=specimen width (in)

These parameters were used in evaluating the present invention and in providing a comparison between conventional surface preparation methods and the present invention.

EXAMPLE 1

Surface Treatment

To demonstrate the synergistic effect of treating titanium bond surfaces with an aqueous metasilicate solution followed by a silane solution, precleaned tapered double cantilever beam (TDCB) specimens made from titanium (Ti-6Al-4V, i.e., 6% aluminum and 4% vanadium titanium alloy) alloy were sprayed with various concentrations of sodium metasilicate in deionized water followed by spraying with various concentrations of γ-glycidoxypropyltrimethoxysilane (Union Carbide A187) in a sodium acetate/acetic acid buffered solution. The bond surfaces were air dried at ambient conditions for 1 hour. Specimens were bonded with Dexter Hysol EA946 epoxy adhesive and cured for a minimum of 36 hours at 105° F.

The results of the concentration study are shown in Table III. The data suggest that there exists a metasilicate/silane synergism with bondline fracture toughness on titanium. A fracture toughness of 21.84 in-lb/in², obtained with a 2 percent silane concentration, was increased to 23.99 in-lb/in² (a 10 percent increase) by pretreating the surface with a 0.2 percent wt./wt. sodium metasilicate solution. This constitutes a 285 percent increase over the 6.32 in-lb/in² obtained by conventional vapor degreasing and grit blasting. A fracture toughness of 20.46 in-lb/in², obtained with a 5 percent wt./wt. silane concentration, was increased to 26.54 in-lb/in² (a 30 percent increase) when pretreated with a 0.2 percent wt./wt. sodium metasilicate solution. This constitutes a 326 percent improvement over the vapor degreased and grit blasted surface.

The maximum synergism for titanium appears to occur at a sodium metasilicate concentration of about 0.2% wt/wt (0.016 molar). Higher concentrations of silane, i.e. 10 percent (0.4 molar), appear to mask the effect of metasilicate, with fracture toughness values ranging from 29.51 to 33.82 in-lb/in², an increase of 374 to 443 percent over the vapor degrease and grit blast base line. One can conclude from this investigation that the metasilicate/silane process can be used to enhance the fracture toughness of bonds made to titanium substrates.

TABLE III

Effect of Sodium Metasilicate and Silane on Fracture Toughness for EA946/titanium.

| Sodium Metasilicate (% wt./wt.) | Aqueous A187 (% wt./wt.) | Fracture Toughness (in-lbs/in²) | Standard Deviation |
|---|---|---|---|
| 0.0 | 0.0 | 6.23† | 0.54 |
| 0.2 | 0.0 | 11.59 | 2.32 |
| 0.0 | 2.0 | 21.84 | 2.49 |
| 0.2 | 2.0 | 23.99 | 0.32 |
| 0.0 | 5.0 | 20.46 | 4.45 |
| 0.05 | 5.0 | 20.07 | 1.51 |
| 0.1 | 5.0 | 24.51 | 1.80 |
| 0.2 | 5.0 | 26.54 | 2.45 |
| 0.4 | 5.0 | 18.65 | 2.16 |
| 0.4 | 5.0 | 16.45† | 0.97 |
| 0.0 | 10.0 | 33.82 | 1.21 |
| 0.2 | 10.0 | 32.76 | 0.14 |
| 0.4 | 10.0 | 30.63 | 1.53 |
| 1.0 | 10.0 | 29.51 | 1.12 |

†Bond Surface aged for 72 hours at 90% R.H. and 75° F.

This procedure, when used to treat previously cleaned surfaces for bonding, is referred to as the Metasilicate Silane Surface Treatment (MSST). Treatment of a "dirty" bond surface with an appropriate metasilicate containing aqueous cleaner followed by spray rinsing with the same aqueous silane solution would provide the same enhancement of bondline fracture toughness. The process of using an aqueous cleaner containing silicates followed by a silane solution rinse to simultaneously clean and prepare the bond surface for bonding has been given the name of In-Situ Process (ISP).

EXAMPLE 2

Process Insensitivity

The effect of aging treated adherends at high humidity prior to bonding was examined using 0.4% wt./wt. (0.033 molar) sodium metasilicate and 5% wt./wt. (0.021 molar) aqueous A187 silane primer. Three sets of three titanium (Ti-6Al-4V) TDCB specimens were precleaned by TCA vapor degreasing followed by grit blasting. The specimens' bond surfaces were prepared using the MSST process as described in Example 1. Two sets of TDCB specimens were treated with the MSST process, while one set remained untreated. The first treated set was bonded immediately after the silane dry time with EA946 adhesive. The second treated set and the untreated set were subjected to aging for 72 hours at 90% relative humidity. After aging, the treated and untreated sets were bonded. All samples were cured for a minimum of 36 hours at 105° F. The resulting bondline fracture toughness values are shown in Table III.

The surfaces that were bonded immediately after the metasilicate/silane surface treatment gave a fracture toughness of 18.65 in-lb/in$^2$. The treated surfaces held for 72 hours at 90 percent relative humidity (R.H.) gave a fracture toughness of 16.45 in-lb.in$^2$. The untreated surfaces gave a fracture toughness of 6.23 in-lb/in$^2$. One can conclude from this investigation that post treatment aging at 90% R.H. for 72 hours has little or no effect on the mode I fracture toughness compared to specimens bonded immediately after treatment. These data demonstrate the process insensitivity of the metasilicate/silane process to adverse process conditions including relative humidity and time delays.

SUMMARY

In summary the present invention provides effective and efficient methods of surface preparation and treatment of titanium and titanium alloys in order to provide stable adhesive bonding to titanium substrates. The methods of the present invention are relatively simple, and use readily available materials. In addition, the materials employed do not present a significant environmental hazard.

Furthermore, the methods of the present invention increase bond strength. In that regard, the methods result in stable bonds which do not significantly degrade over time. While the above discussion is focused on the application of adhesives, the same general results would be expected when using the present invention for the application of paints or other coatings as well.

The present invention may be embodied in other specific forms without departing from its essential characteristics. The described embodiments are to be considered in all respects only as illustrative and not restrictive.

The claimed invention is:

1. A process for preparing a titanium or titanium alloy surface for bonding comprising the steps of:

treating a titanium or titanium alloy surface with an aqueous solution of a silicate, wherein the silicate in solution has a concentration of at least 0.004 M; and subsequently treating the surface with a solution of a reactive organofunctional silane, wherein the silane solution is substantially free of a cross-linking agent such that the silane solution treatment does not produce a siloxane coating.

2. A process as defined in claim 1, wherein the silicate comprises a soluble alkali metal, alkaline earth metal, amine or quaternary ammonium metasilicate.

3. A process as defined in claim 1, wherein the silicate is sodium metasilicate.

4. A process as defined in claim 1, wherein the aqueous silicate solution comprises from about 0.004 M to about 0.04 M metasilicate.

5. A process as defined in claim 1, wherein the aqueous silicate solution comprises from about 0.015 M to about 0.035 M metasilicate.

6. A process as defined in claim 1, wherein the silane solution comprises from about 0.02 M to about 0.5 M silane.

7. A process as defined in claim 1, wherein the reactive organofunctional silane is gamma-glycidoxypropyltrimethoxysilane.

8. A process as defined in claim 1, wherein the reactive organofunctional silane is selected from the group consisting of a polyfunctional methoxy, polyfunctional ethoxy, and polyfunctional hydride silane.

9. A process as defined in claim 1, wherein the reactive organofunctional silane is selected from the group consisting of gamma-glycidoxypropyltrimethoxysilane, gamma-aminopropyl-trimethoxysilane, gamma-methacryloxypropyltri-methoxysilane, N-[2-(vinylbenzylamino)ethyl]-3-aminopropyl-trimethoxysilane, phenyltrimethoxysilane, [glycidoxy(epoxy)] polyfunctional methoxysilane.

10. A process as defined in claim 1, further comprising the step of applying an adhesive to the titanium or titanium alloy surface.

11. A process as defined in claim 1, further comprising the step of applying a paint to the titanium or titanium alloy surface.

12. A process as defined in claim 1, wherein the aqueous solution of a silicate further comprises a surface cleaning agent.

13. A process as defined in claim 12, wherein the cleaning agent is a detergent.

14. A process as defined in claim 12, wherein the cleaning agent is an emulsifier.

15. A process for preparing a titanium or titanium alloy surface for bonding comprising the steps of:

treating a titanium or titanium alloy surface with a solution consisting essentially of an aqueous solution of a soluble metasilicate and a cleaning agent, wherein the metasilicate has a concentration in the range from about 0.004 M to about 0.04 M; and subsequently treating the surface with a solution of a reactive organofunctional silane containing a plurality of methoxy, ethoxy, or hydride substituent groups, wherein the silane has a concentration in the range from about 0.02 M to about 0.5 M silane.

16. A process as defined in claim 15, wherein the aqueous metasilicate solution has a metasilicate concentration in the range from about 0.015 M to about 0.035 M metasilicate.

17. A process as defined in claim 15, wherein the cleaning agent is a detergent.

18. A process as defined in claim 15, wherein the cleaning agent is an emulsifier.

19. A process as defined in claim 15, further comprising the step of applying an adhesive to the titanium or titanium alloy surface.

20. A process as defined in claim 15, further comprising the step of applying a paint to the titanium or titanium alloy surface.

* * * * *